United States Patent
Sakakibara et al.

(10) Patent No.: US 10,946,460 B2
(45) Date of Patent: Mar. 16, 2021

(54) SPLITTING APPARATUS AND SPLITTING METHOD

(71) Applicant: Toyota Jidosha Kabushiki Kaisha, Toyota (JP)

(72) Inventors: Nobuyuki Sakakibara, Toyota (JP); Masayuki Miura, Toyota (JP); Takahiro Hashimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 8 days.

(21) Appl. No.: 16/426,508

(22) Filed: May 30, 2019

(65) Prior Publication Data

US 2020/0038976 A1 Feb. 6, 2020

(30) Foreign Application Priority Data

Aug. 2, 2018 (JP) .............................. JP2018-145882

(51) Int. Cl.
*B23D 31/00* (2006.01)

(52) U.S. Cl.
CPC .................................. *B23D 31/002* (2013.01)

(58) Field of Classification Search
CPC ...... B23D 31/002; B23D 15/08; B23D 15/00; B21D 28/00; B21D 28/14
USPC .......................................................... 225/2
See application file for complete search history.

(56) References Cited

U.S. PATENT DOCUMENTS

| | | | | | |
|---|---|---|---|---|---|
| 3,245,296 | A | * | 4/1966 | Valente ................ | B23D 35/008 83/162 |
| 5,438,897 | A | * | 8/1995 | Chun ................... | B21D 45/006 83/139 |
| 5,553,523 | A | * | 9/1996 | Saito ..................... | B21D 45/006 83/136 |
| 5,701,790 | A | * | 12/1997 | Saito ....................... | B21D 28/12 83/136 |
| 2012/0012632 | A1 | * | 1/2012 | Tominaga ............... | C03B 33/04 225/2 |
| 2017/0320122 | A1 | * | 11/2017 | Matsuno ................ | B21D 28/34 |
| 2018/0272408 | A1 | * | 9/2018 | Yasutomi ............... | B21D 28/34 |
| 2019/0247906 | A1 | * | 8/2019 | Serizawa ............... | B21D 22/20 |

FOREIGN PATENT DOCUMENTS

| | | |
|---|---|---|
| CN | 203955840 U | 11/2014 |
| JP | 2002-172520 A | 6/2002 |
| JP | 2005-028437 A | 2/2005 |

(Continued)

*Primary Examiner* — Sean M Michalski
(74) *Attorney, Agent, or Firm* — Dinsmore & Shohl LLP (57) ABSTRACT

A splitting apparatus includes: a lower mold configured to allow placement of a plate material on the lower mold and arranged on a first side with respect to a split target line of the plate material; an upper blade configured to be raised or lowered with respect to the lower mold; and a support member arranged on a second side with respect to the split target line of the plate material. The splitting apparatus is configured that, in a case where the upper blade is lowered with respect to the lower mold in a state where the plate material is supported by the lower mold and the support member, a cut is formed on the split target line of the plate material by the upper blade, a crack is formed in conjunction with formation of the cut, and the plate material is split along the split target line.

12 Claims, 4 Drawing Sheets

(56) References Cited

FOREIGN PATENT DOCUMENTS

| | | |
|---|---|---|
| JP | 2008-100273 A | 5/2008 |
| JP | 2009-022976 A | 2/2009 |
| JP | 2016-191088 A | 11/2016 |
| JP | 2018-069419 A | 5/2018 |

* cited by examiner

SPLITTING APPARATUS AND SPLITTING METHOD

CROSS-REFERENCE TO RELATED APPLICATIONS

This application claims priority to Japanese Patent Application No. 2018-145882 filed on Aug. 2, 2018, which is incorporated herein by reference in its entirety including the specification, drawings and abstract.

BACKGROUND

1. Technical Field

The present disclosure relates to a splitting apparatus and a splitting method.

2. Description of Related Art

Conventionally, a trimming apparatus that performs trimming to eliminate a scrap portion (an unnecessary portion) from a plate material has been known (for example, see Japanese Patent Application Publication No. 2005-28437 (JP 2005-28437 A)).

The trimming apparatus disclosed in JP 2005-28437 A is configured that an upper mold is lowered with respect to a lower mold in a state where an aluminum alloy plate is held between the lower mold and a presser plate, so as to cut and eliminate a scrap portion sticking out of the lower mold.

SUMMARY

In a trimming apparatus of the related art, there is a case where chips are produced when the scrap portion is cut and eliminated. A detailed description will be made on trimming by a trimming apparatus 200 according to the related art with reference to FIG. 5 to FIG. 7.

Figure 5:
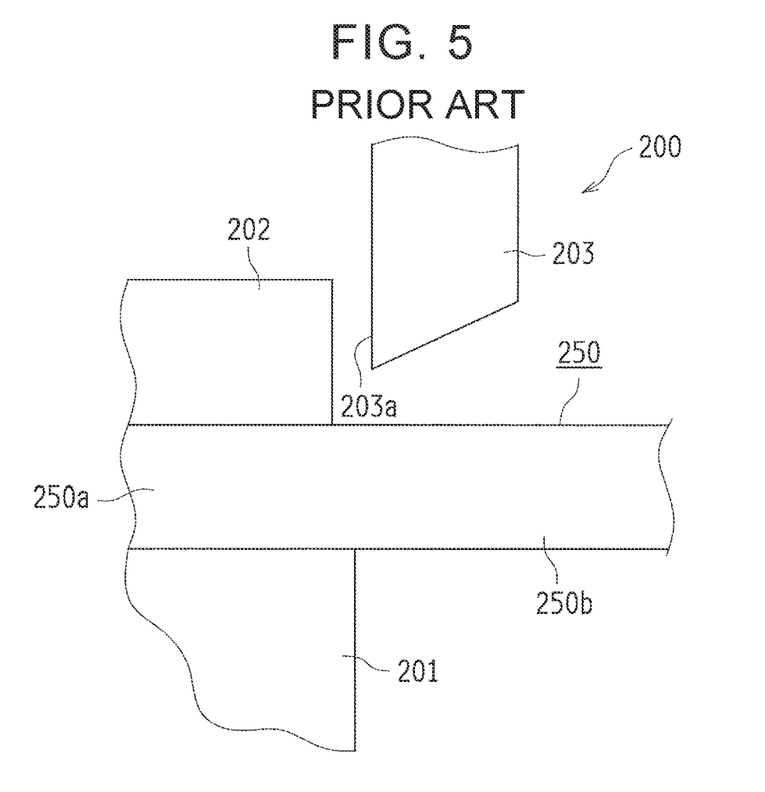
FIG. 5 is a schematic view that illustrates a trimming apparatus according to the related art.

As shown in FIG. 5, the trimming apparatus 200 includes: a lower mold 201 on which a plate material 250 can be placed; a pad 202 that presses the plate material 250 against the lower mold 201; and an upper mold 203 that can be raised or lowered with respect to the lower mold 201. The plate material 250 is made of an aluminum alloy, for example, and has a molded article portion 250a and a scrap portion 250b. The lower mold 201 is arranged under the molded article portion 250a, and the scrap portion 250b sticks out of the lower mold 201. That is, the lower mold 201 is not arranged under the scrap portion 250b, and the scrap portion 250b is in a floating state.

Figure 6:
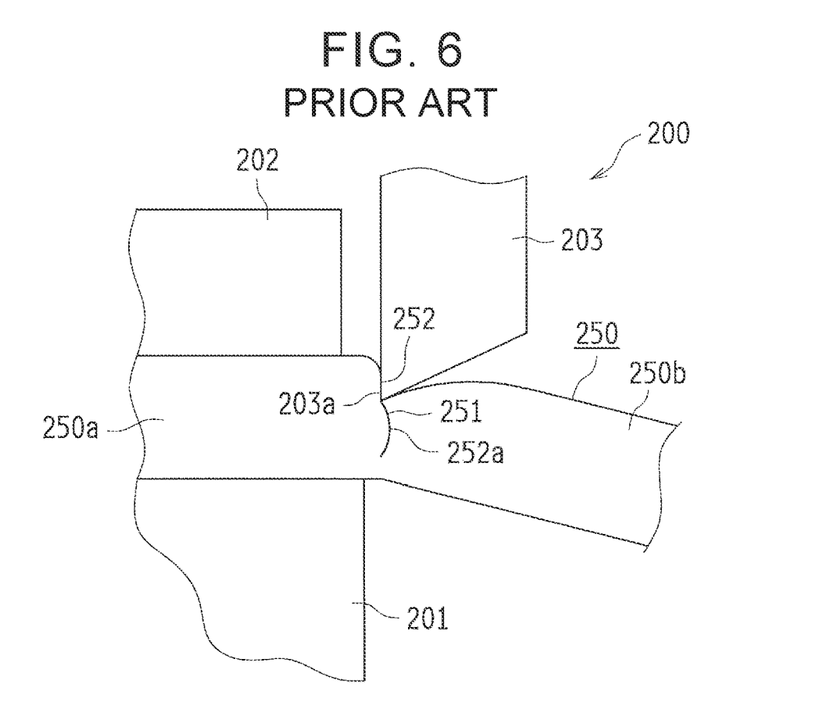
FIG. 6 is a schematic view that illustrates trimming by the trimming apparatus according to the related art and a state where a curved crack is formed.

The upper mold 203 is lowered with respect to the lower mold 201. Then, when the plate material 250 is cut by a blade portion 203a of the upper mold 203, as shown in FIG. 6, the scrap portion 250b of the plate material 250 collapses (a free end side of the scrap portion 250b (a right side in FIG. 6) falls downward). As a result, a curved crack 251 is formed ahead of (below) a shear plane by the blade portion 203a. In this way, a projected portion 252a that is projected to the scrap portion 250b side is formed on a cut end surface 252 of the molded article portion 250a of the plate material 250.

Figure 7:
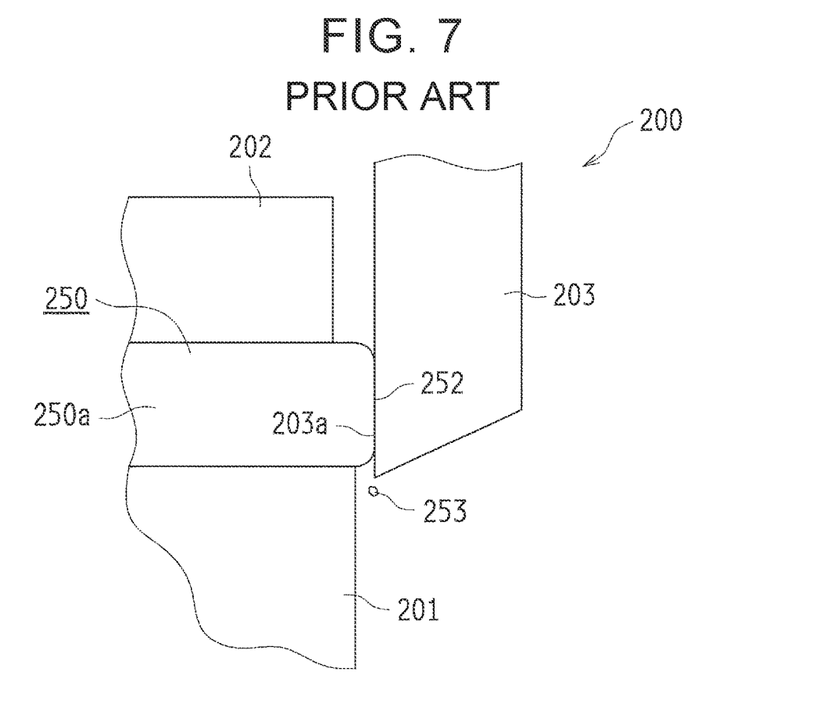
FIG. 7 is a schematic view that illustrates the trimming by the trimming apparatus according to the related art and a state at the time when a scrap portion is eliminated and an upper mold is then raised.

Next, the plate material 250 is cut to eliminate the scrap portion 250b. Thereafter, as shown in FIG. 7, when the upper mold 203 is raised with respect to the lower mold 201, the projected portion 252a (see FIG. 6) is ground by the blade portion 203a of the upper mold 203. As a result, a chip 253 is produced. Note that such a problem is unknown.

The disclosure provides a splitting apparatus and a splitting method capable of preventing production of chips at the time of splitting a plate material.

A splitting apparatus according to a first aspect of the disclosure splits a plate material along a split target line, and includes: a lower mold configured to allow placement of the plate material on the lower mold and arranged on a first side with respect to the split target line of the plate material; an upper blade configured to be raised or lowered with respect to the lower mold; and a support member arranged on a second side with respect to the split target line of the plate material. The splitting apparatus is configured that, in a case where the upper blade is lowered with respect to the lower mold in a state where the plate material is supported by the lower mold and the support member, a cut is formed on the split target line of the plate material by the upper blade, a crack is formed in the plate material in conjunction with formation of the cut, and the plate material is split along the split target line.

With such a configuration, when the plate material is split, the second side with respect to the split target line of the plate material is supported by the support member. Thus, the second side with respect to the split target line of the plate material can be prevented from collapsing. As a result, the crack is formed linearly, a cut end surface of the first side with respect to the split target line of the plate material is flattened, and thus production of chips can be prevented.

In the above splitting apparatus, a bite amount of the upper blade with respect to the plate material at a time when the upper blade is lowered the most with respect to the lower mold may be set to be equal to or less than a thickness of the plate material.

With such a configuration, the upper blade can be prevented from rubbing against the lower mold.

In the above splitting apparatus, the bite amount of the upper blade with respect to the plate material at the time when the upper blade is lowered the most with respect to the lower mold may be set to be equal to or greater than a half of the thickness of the plate material.

With such a configuration, the cut can appropriately be formed in the plate material.

In the above splitting apparatus, a lower blade may be provided in the lower mold.

With such a configuration, the plate material can easily be split by the cut formed by the lower blade.

The above splitting apparatus may include a pad configured to be raised or lowered with respect to the lower mold end pressing the plate material against the lower mold. The upper blade may have a blade portion that is attached to the pad and is projected downward from the pad.

With such a configuration, a bite amount of the blade portion of the upper blade with respect to the plate material can easily be adjusted.

In the above splitting apparatus, the first side with respect to the split target line of the plate material may be a molded article portion, and the second side with respect to the split target line of the plate material may be a scrap portion.

With such a configuration, the scrap portion can be eliminated by splitting the plate material.

In the above splitting apparatus, the plate material may be made of an aluminum alloy.

With such a configuration, the plate material, which is made of the aluminum alloy, can be split.

A splitting method according to a second aspect of the disclosure splits a plate material along a split target line, and includes: placing the plate material on a lower mold so as to support a first side with respect to the split target line of the plate material by the lower mold and support a second side with respect to the split target line of the plate material by a support member; and lowering an upper blade with respect to the lower mold in a state where the plate material is supported by the lower mold and the support member, so as to form a cut on the split target line of the plate material by the upper blade, form a crack in the plate material in conjunction with formation of the cut, and split the plate material along the split target line.

With such a configuration, when the plate material is split the second side with respect to the split target line of the plate material is supported by the support member. Thus, the second side with respect to the split target line of the plate material can be prevented from collapsing. As a result, the crack is formed linearly, a cut end surface of the first side with respect to the split target line of the plate material is flattened, and thus production of chips can be prevented.

According to the splitting apparatus and the splitting method according to the disclosure, it is possible to prevent the production of the chips at the time of splitting the plate material.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will hereinafter be made on an embodiment of the disclosure with reference to the drawings. Note that the following description will be made on a case where the disclosure is applied to a trimming apparatus as an example of a splitting apparatus.

First, a description will be made on a trimming apparatus 100 according to the embodiment of the disclosure with reference to FIG. 1.

Figure 1:
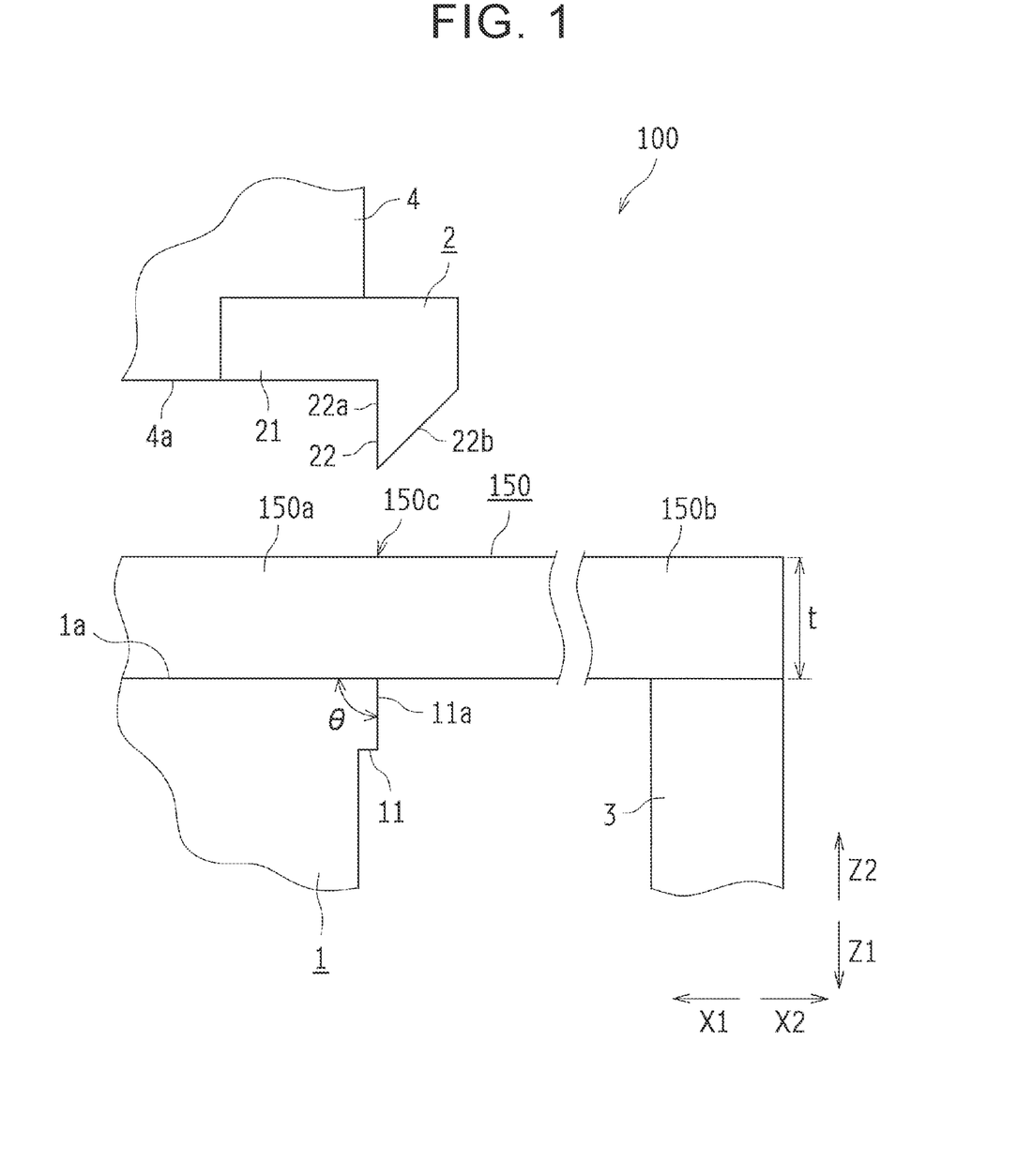
FIG. 1 is a schematic view that illustrates a trimming apparatus according to this embodiment.

As shown in FIG. 1, the trimming apparatus 100 includes a lower mold 1, an upper blade 2, a support member 3, and a pad 4, and is configured to perform trimming to eliminate a scrap portion (an unnecessary portion) 150b from a plate material 150. This trimming apparatus 100 is configured that the upper blade 2 and the pad 4 are pressed against the plate material 150, which is supported by the lower mold 1 and the support member 3, so as to split the plate material 150 along a split target line 150c.

The plate material 150 is made of an aluminum alloy and is a vehicle body panel, for example. This plate material 150 has a molded article portion 150a and the scrap portion 150b, and the split target line 150c is set on a boundary between the molded article portion 150a and the scrap portion 150b. In an example shown in FIG. 1, the plate material 150 has a flat plate shape, the molded article portion 150a is arranged on one side (an X1 direction side), and the scrap portion 150b is arranged on the other side (an X2 direction side). The split target line 150c extends in a perpendicular direction with respect to a sheet for FIG. 1. That is, the split target line 150c has a linear shape when seen in a plan view. Here, the X1 direction side is an example of the "first side with respect to the split target line of the plate material" in the disclosure, and the X2 direction side is an example of the "second side with respect to the split target line of the plate material" in the disclosure.

The lower mold 1 has a placement surface 1a, and is configured that the plate material 150 can be placed on the placement surface 1a. In the case where the plate material 150 is placed on the lower mold 1, the lower mold 1 is arranged under (in a Z1 direction of) the molded article portion 150a while the lower mold 1 is not arranged under the scrap portion 150b. That is, the molded article portion 150a is placed on the lower mold 1, and the scrap portion 150b sticks out of the lower mold 1.

In addition, a lower blade 11 is provided at an end (an end on the X2 direction side) of the placement surface 1a of the lower mold 1, and the lower blade 11 has a blade portion 11a that extends along the split target line 150c of the plate material 150. This blade portion 11a is arranged under the split target line 150c, and is formed to extend in the perpendicular direction with respect to the sheet for FIG. 1. Here, an angle θ of a blade surface of the lower blade 11 with respect to the placement surface 1a of the lower mold 1 is 90 degrees, for example. However, the angle θ may be 80 to 100 degrees.

The support member 3 is configured to support the scrap portion 150b of the plate material 150. That is, the support member 3 is arranged under the scrap portion 150b, and the scrap portion 150b is placed on the support member 3. The support member 3 is arranged at a position away from the split target line 150c, and is arranged at an end (an end on the X2 direction side) of the scrap portion 150b, for example.

The upper blade 2 is attached to the pad 4, and the pad 4 is provided to press the plate material 150 against the lower mold 1. The pad 4 is configured to be able to be raised or lowered with respect to the lower mold 1, and the upper blade 2 is configured to be able to be raised or lowered with the pad 4 with respect to the lower mold 1. The pad 4 has a presser surface 4a that abuts the plate material 150, and is arranged above (in a Z2 direction of) the lower mold 1, that is, the molded article portion 150a.

The upper blade 2 has: a body portion 21 that is attached to the pad 4; and a blade portion 22 that is projected downward from the body portion 21. A lower end of the body portion 21 is flush with the presser surface 4a, and the blade portion 22 is projected downward from the presser surface 4a. The blade portion 22 is formed to extend along the split target line 150c of the plate material 150. The blade portion 22 is arranged above the split target line 150c, and is formed to extend in the perpendicular direction with respect to the sheet for FIG. 1. In addition, the blade portion 22 has: a blade surface 22a that extends in a vertical direction; and a tip surface 22b that extends obliquely upward from a tip (a lower end) of the blade surface 22a. An angle defined by the blade surface 22a and the tip surface 22b is set at 45 degrees, for example. Here, a clearance between the blade portion 22 of the upper blade 2 and the blade portion 11a of the lower blade 11 is set to a value from 0 to ±0.1 mm, for example.

A projection amount of the blade portion 22 of the upper blade 2 with respect to the presser surface 4a is set to be equal to or greater than a half of a thickness t of the plate material 150, and is also set to be equal to or less than the thickness t of the plate material 150. Accordingly, a bite amount of the blade portion 22 with respect to the plate material 150 at the time when the upper blade 2 is lowered the most with respect to the lower mold 1 is set to be equal to or greater than the half of the thickness t of the plate material 150, and is also set to be equal to or less than the thickness t of the plate material 150.

—Trimming by Trimming Apparatus (Splitting Method)—

Figure 2:
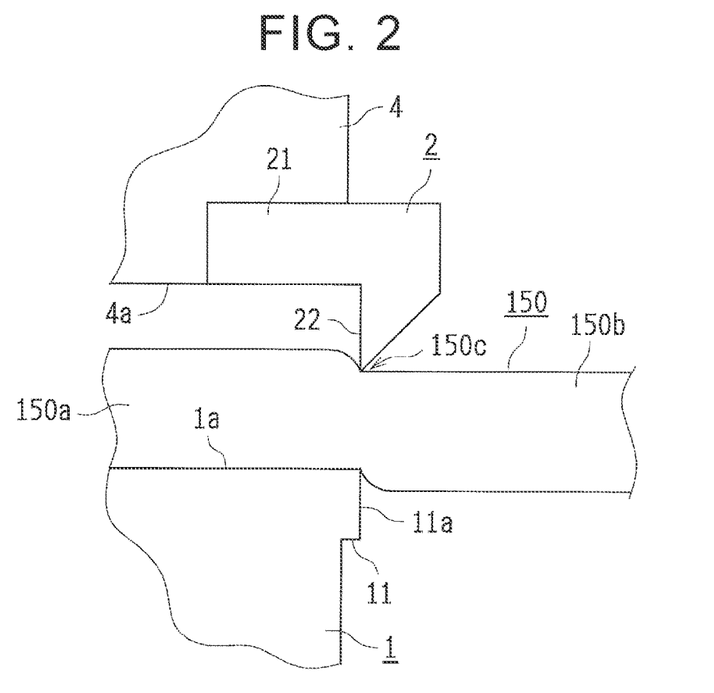
FIG. 2 is a schematic view that illustrates trimming by the trimming apparatus according to this embodiment and a state where an upper blade starts shearing.
Figure 3:
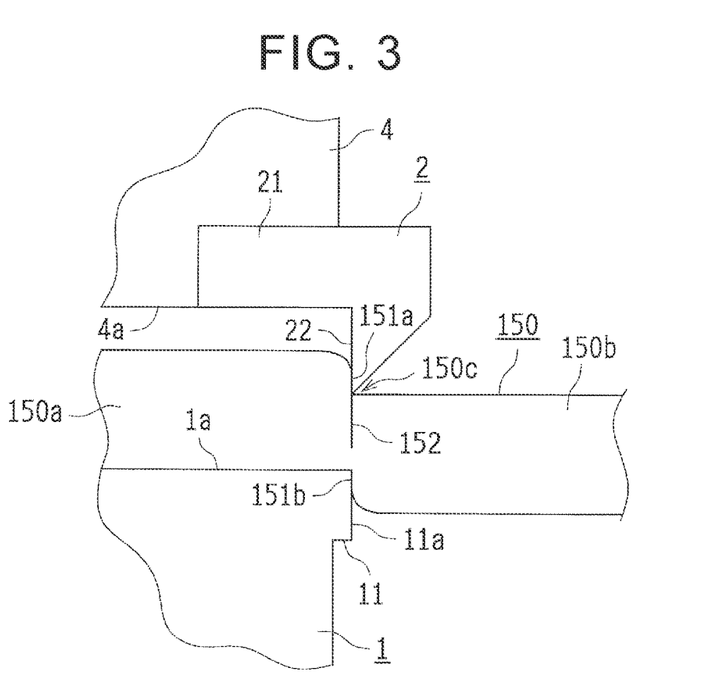
FIG. 3 is a schematic view that illustrates the trimming by the trimming apparatus according to this embodiment and a state where a crack is formed linearly.
Figure 4:
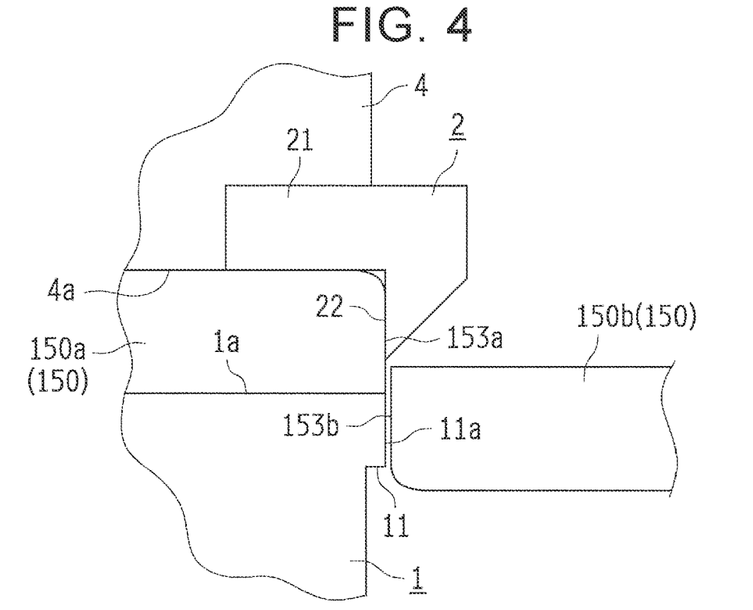
FIG. 4 is a schematic view that illustrates the trimming by the trimming apparatus according to this embodiment and a slate where a plate material is split.

Next, a description will be made on the trimming by the trimming apparatus 100 (an operation example of the trimming apparatus 100) according to this embodiment with reference to FIG. 1 to FIG. 4. In FIG. 2 to FIG. 4, an area near the split target line 150c of the plate material 150 is enlarged.

First, as shown in FIG. 1, the plate material 150 is placed on the placement surface 1a of the lower mold 1. In this way, the molded article portion 150a of the plate material 150 is supported by the lower mold 1, and the scrap portion 150b of the plate material 150 is supported by the support member 3. At this time, the split target line 150c of the plate material 150 is arranged above the blade portion 11a of the lower blade 11, and the blade portion 22 of the upper blade 2 is arranged above the split target line 150c of the plate material 150 with a clearance being interposed therebetween. Then, when the pad 4 is lowered (moved in the Z1 direction) with respect to the lower mold 1, the upper blade 2 is lowered.

Next, as shown in FIG. 2, the blade portion 22 of the upper blade 2 abuts the split target line 150c of the plate material 150, and the upper blade 2 and the lower blade 11 start shearing. At this time, since the scrap portion 150b is supported by the support member 3 (see FIG. 1), the scrap portion 150b does not collapse. That is, even when the scrap portion 150b, which sticks out of the lower mold 1, in the plate material 150 is pressed by the upper blade 2, the scrap portion 150b maintains a substantially horizontal state. In other words, the support member 3 prevents a posture change of the plate material 150.

Then, when the upper blade 2 is further lowered, as shown in FIG. 3, a cut (a shear plane) 151a is formed on an upper surface of the plate material 150 by the upper blade 2, and a crack 152 is formed in conjunction with the formation of the cut 151a. This crack 152 is formed to extend linearly downward from the cut 151a. That is, the crack 152 is formed to extend in the substantially vertical direction. In addition, a cut 151b is formed on a lower surface of the plate material 150 by the lower blade 11. Note that the crack 152 is formed due to brittleness of the plate material 150.

Thereafter, the upper blade 2 is further lowered, and the crack 152 and the cut 151b are connected. As a result, as shown in FIG. 4, the plate material 150 is split by the split target line 150c (see FIG. 1), and the scrap portion 150b is eliminated. At this time, the molded article portion 150a of the plate material 150 is pressed against the lower mold 1 by the pad 4. In addition, the tip of the blade portion 22 of the upper blade 2 is arranged above a lower surface of the molded article portion 150a of the plate material 150. Furthermore, a cut end surface 153a of the molded article portion 150a and a cut end surface 153b of the scrap portion 150b are substantially flat.

—Effects—

In this embodiment, as described above, the support member 3 that supports the scrap portion 150b of the plate material 150 is provided. Accordingly, when the plate material 150 is split, the scrap portion 150b is supported by the support member 3, and thus the scrap portion 150b can be prevented from collapsing. As a result, the crack 152 is formed linearly, the cut end surface 153a of the molded article portion 150a is flattened, and thus production of chips can be prevented. Therefore, quality of the molded article portion 150a, which is formed by eliminating the scrap portion 150b from the plate material 150, can be improved.

In this embodiment, the projection amount of the blade portion 22 of the upper blade 2 with respect to the presser surface 4a is set to be equal to or less than the thickness t of the plate material 150. As a result, it is possible to prevent the blade portion 22 of the upper blade 2 from rubbing against the blade portion 11a of the lower blade 11. Therefore, it is possible to hinder adhesion of the blade portion 22 and the blade portion 11a.

In this embodiment, the projection amount of the blade portion 22 of the upper blade 2 with respect to the presser surface 4a is set to be equal to or greater than the half of the thickness t of the plate material 150. Therefore, the cut 151a and the crack 152 can appropriately be formed in the plate material 150.

In this embodiment, the lower blade 11 is provided in the lower mold 1. Therefore, the plate material 150 can easily be split by the cut 151b that is formed by the lower blade 11.

In this embodiment, the upper blade 2 is attached to the pad 4. Thus, the bite amount of the blade portion 22 of the upper blade 2 with respect to the plate material 150 can easily be adjusted. In addition, compared to a case where the upper blade is not attached to the pad and the upper blade is separately driven from the pad, the trimming apparatus 100 can be downsized.

EXPERIMENTAL EXAMPLES

Next, a description will be made on Experimental Examples 1 to 3 that were implemented to confirm the effects of this embodiment. The plate material 150 used in Experimental Examples 1 to 3 is made of the aluminum alloy and has the thickness t of 1.6 mm.

Experimental Example 1

In Experimental Example 1, the bite amount of the upper blade 2 with respect to the plate material 150 was adjusted to confirm capability of splitting the plate material 150. In this Experimental Example 1, the angle θ of the blade surface of the lower blade 11 with respect to the placement surface 1a of the lower mold 1 was set at 90 degrees. That is, the blade surface of the lower blade 11 extends in the vertical direction. Experimental results in Experimental Example 1 are shown in Table 1. In Table 1, examples in each of which the plate material 150 was split are indicated by A, and examples in each of which the plate material 150 was not split are indicated by B.

TABLE 1

|  | Bite amount of plate material with respect to upper blade | Rate of bite amount with respect to plate thickness | Capability of splitting |
|---|---|---|---|
| Comparative Example 1 | 0.2 mm | 13% | B |
| Comparative Example 2 | 0.7 mm | 44% | B |
| Example 1 | 0.8 mm | 50% | A |
| Example 2 | 0.9 mm | 56% | A |
| Example 3 | 1.0 mm | 63% | A |
| Example 4 | 1.1 mm | 69% | A |
| Example 5 | 1.2 mm | 75% | A |

As shown in Table 1, in regard to samples used in Examples 1 to 5, in each of which the bite amount of the upper blade 2 is equal to or greater than the half of the thickness of the plate material 150, the plate material 150 was split. Meanwhile, in regard to samples used in Comparative Examples 1 and 2, in each of which the bite amount of the upper blade 2 is less than the half of the thickness of the plate material 150, the plate material 150 was not split.

Experimental Example 2

In Experimental Example 2, the bite amount of the upper blade 2 with respect to the plate material 150 was adjusted to confirm the capability of splitting the plate material 150. In this Experimental Example 2, the angle θ of the blade surface of the lower blade 11 with respect to the placement surface 1a of the lower mold 1 was set at 80 degrees. That is, the lower blade 11 is tilted such that a lower side of the lower blade 11 is arranged on an inner side (the X1 direction side). Experimental results in Experimental Example 2 are shown in Table 2. In Table 2, examples in each of which the plate material 150 was split are indicated by A, and examples in each of which the plate material 150 was not split are indicated by B.

TABLE 2

|  | Bite amount of plate material with respect to upper blade | Rate of bite amount with respect to plate thickness | Capability of splitting |
|---|---|---|---|
| Comparative Example 3 | 0.2 mm | 13% | B |
| Comparative Example 4 | 0.7 mm | 44% | B |
| Example 6 | 0.8 mm | 50% | A |
| Example 7 | 0.9 mm | 56% | A |
| Example 8 | 1.0 mm | 63% | A |
| Example 9 | 1.1 mm | 69% | A |
| Example 10 | 1.2 mm | 75% | A |

As shown in Table 2, in regard to samples used in Examples 6 to 10, in each of which the bite amount of the upper blade 2 is equal to or greater than the half of the thickness of the plate material 150, the plate material 150 was split. Meanwhile, in regard to samples used in Comparative Examples 3 and 4, in each of which the bite amount of the upper blade 2 is less than the half of the thickness of the plate material 150, the plate material 150 was not split.

Experimental Example 3

In Experimental Example 3, the bite amount of the upper blade 2 with respect to the plate material 150 was adjusted to confirm the capability of splitting the plate material 150. In this Experimental Example 3, the angle θ of the blade surface of the lower blade 11 with respect to the placement surface 1a of the lower mold 1 was set at 100 degrees. That is, the lower blade 11 is tilted such that the lower side of the lower blade 11 is arranged on an outer side (the X2 direction side). Experimental results in Experimental Example 3 are shown in Table 3. In Table 3, examples in each of which the plate material 150 was split are indicated by A, and examples in each of which the plate material 150 was not split are indicated by B.

TABLE 3

|  | Bite amount of plate material with respect to upper blade | Rate of bite amount with respect to plate thickness | Capability of splitting |
|---|---|---|---|
| Comparative Example 5 | 0.2 mm | 13% | B |
| Comparative Example 6 | 0.7 mm | 44% | B |
| Example 11 | 0.8 mm | 50% | A |
| Example 12 | 0.9 mm | 56% | A |
| Example 13 | 1.0 mm | 63% | A |
| Example 14 | 1.1 mm | 69% | A |
| Example 15 | 1.2 mm | 75% | A |

As shown in Table 3, in regard to samples used in Examples 11 to 15, in each of which the bite amount of the upper blade 2 is equal to or greater than the half of the thickness of the plate material 150, the plate material 150 was split. Meanwhile, in regard to samples used in Comparative Examples 5 and 6, in each of which the bite amount of the upper blade 2 is less than the half of the thickness of the plate material 150, the plate material 150 was not split.

Therefore, it was found that, in the case where the plate material 150 was made of the aluminum alloy and the bite amount of the upper blade 2 was equal to or greater than the half of the thickness of the plate material 150, the plate material 150 could be split regardless of the angle θ of the blade surface of the lower blade 11 with respect to the placement surface 1a of the lower mold 1.

-Other Embodiments-

Note that the embodiment disclosed herein is illustrative in all respects and thus does not serve as a basis of narrow interpretation. Therefore, the technical scope of the disclosure should not be construed by the above-described embodiment only but is defined on the basis of the claims. In addition, the technical scope of the disclosure includes all modifications falling within the claims and equivalents thereof.

For example, in the above embodiment, the example in which the disclosure is applied to the trimming apparatus 100 has been described. However, the disclosure is not limited thereto, and the disclosure may be applied to a splitting apparatus other than the trimming apparatus.

In the above embodiment, the example in which the material for the plate material 150 is the aluminum alloy has been described. However, the disclosure is not limited thereto. The material for the plate material may be other than the aluminum alloy as long as the linear crack is formed in the plate material in conjunction with the formation of the cut, and the plate material is split.

In the above embodiment, the example in which the plate material 150 is the vehicle body panel has been described. However, the disclosure is not limited thereto, and the plate material may be other than the vehicle body panel.

In the above embodiment, the example in which the plate material 150 has the flat plate shape has been described.

However, the disclosure is not limited thereto, and the plate material may have any shape.

In the above embodiment, the example in which the planar shape of the split target line 150c is the linear shape has been described. However, the disclosure is not limited thereto, and the planar shape of the split target line may be any shape.

In the above embodiment, the example in which the lower blade 11 is provided in the lower mold 1 has been described. However, the disclosure is not limited thereto. Hie lower blade may not be provided in the lower mold as long as the plate material can be split only by the upper blade.

In the above embodiment, the example in which the support member 3 is arranged at the end of the scrap portion 150b has been described. However, the disclosure is not limited thereto, and the support member may be arranged at a position other than the end of the scrap portion.

In the above embodiment, the example in which the upper blade 2 is attached to the pad 4 has been described. However, the disclosure is not limited thereto. The upper blade may not be attached to the pad, and the upper blade may separately be driven from the pad. In this case, the cut and the crack may be formed by lowering the upper blade in a state where the plate material is pressed against the lower mold by the pad. The bite amount of the upper blade can be adjusted by a die height, for example.

In the above embodiment, the example in which the blade portion 22 has the blade surface 22a and the tip surface 22b and in which the angle defined by the blade surface 22a and the tip surface 22b is 45 degrees has been described. However, the disclosure is not limited thereto, and the blade portion may have any shape.

In the above embodiment, the example in which the projection amount of the blade portion 22 of the upper blade 2 is set to be equal to or greater than the half of the thickness t of the plate material 150 and to be equal to or less than the thickness t of the plate material 150 has been described. However, the disclosure is not limited thereto. The projection amount of the blade portion of the upper blade may be less than the half of the thickness of the plate material, or the projection amount of the blade portion of the upper blade may exceed the thickness of the plate material.

The disclosure can be used for the splitting apparatus and the splitting method for splitting the plate material along the split target line.

What is claimed is:

1. A splitting apparatus that splits a plate material along a split target line, the splitting apparatus comprising:
    a lower mold configured to allow placement of the plate material on the lower mold and arranged on a first side of the split target line of the plate material;
    an upper blade configured to be raised or lowered with respect to the lower mold, the upper blade including a body portion and a blade portion extending from the body portion, the body portion having a lower surface and the blade portion having an inner surface extending perpendicular to the lower surface of the body portion, a bite amount defined by a distance between the lower surface of the body portion and an opposite end of the inner surface of the blade portion, the bite amount being equal to or less than a thickness of the plate material; and
    a support member arranged on a second side of the split target line of the plate material,
    wherein when the upper blade is lowered toward the plate material supported by the lower mold and the support member, the blade portion of the upper blade forms a cut on the split target line of the plate material, a crack is formed in the plate material in conjunction with formation of the cut, and the plate material splits along the split target line.

2. The splitting apparatus according to claim 1, wherein the bite amount of the upper blade with respect to the plate material at a time when the upper blade is lowered the most with respect to the lower mold is set to be equal to or greater than a half of a thickness of the plate material.

3. The splitting apparatus according to claim 1, wherein a lower blade is provided in the lower mold.

4. The splitting apparatus according to claim 1 further comprising:
    a pad configured to be raised or lowered with respect to the lower mold and pressing the plate material against the lower mold, wherein
    the blade portion of the upper blade is attached to the pad and is projected downward from the pad.

5. The splitting apparatus according to claim 1, wherein the plate material on the first side of the split target line is a molded article portion, and
    the plate material on the second side of the split target line is a scrap portion.

6. The splitting apparatus according to claim 1, wherein the plate material is made of an aluminum alloy.

7. A splitting method for splitting a plate material along a split target line, the splitting method comprising:
    placing the plate material on a lower mold so as to support the plate material on a first side of the split target line of the plate material by the lower mold and support the plate material on a second side of the split target line of the plate material by a support member; and
    lowering an upper blade onto the plate material supported by the lower mold and the support member, the upper blade including a body portion and a blade portion extending from the body portion, the body portion having a lower surface and the blade portion having an inner surface extending perpendicular to the lower surface of the body portion, a bite amount defined by a distance between the lower surface of the body portion and an opposite end of the inner surface of the blade portion, the bite amount being equal to or less than a thickness of the plate material,
    forming a cut on the split target line of the plate material by lowering the upper blade toward the plate material to form a crack in the plate material in conjunction with formation of the cut and split the plate material along the split target line.

8. The splitting method according to claim 7, wherein the bite amount of the upper blade with respect to the plate material at a time when the upper blade is lowered the most with respect to the lower mold is set to be equal to or greater than a half of a thickness of the plate material.

9. The splitting method according to claim 7, wherein a lower blade is provided in the lower mold.

10. The splitting method according to claim 7 further comprising:
    a pad configured to be raised or lowered with respect to the lower mold and pressing the plate material against the lower mold, wherein
    the blade portion of the upper blade is attached to the pad and is projected downward from the pad.

11. The splitting method according to claim 7, wherein the plate material on the first side of the split target line is a molded article portion, and the plate material on the second side of the split target line is a scrap portion.

12. The splitting method according to claim 7, wherein the plate material is made of an aluminum alloy.

* * * * *

UNITED STATES PATENT AND TRADEMARK OFFICE
CERTIFICATE OF CORRECTION

PATENT NO. : 10,946,460 B2
APPLICATION NO. : 16/426508
DATED : March 16, 2021
INVENTOR(S) : Nobuyuki Sakakibara, Masayuki Miura and Takahiro Hashimoto Page 1 of 1

It is certified that error appears in the above-identified patent and that said Letters Patent is hereby corrected as shown below:

In the Specification

In Column 03, Line(s) 41, delete "slate" and insert --state--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*